United States Patent [19]

Kimura

[11] 4,101,294
[45] Jul. 18, 1978

[54] PRODUCTION OF HOT, SATURATED FUEL GAS

[75] Inventor: Shiro G. Kimura, Schenectady, N.Y.

[73] Assignee: General Electric Company, Schenectady, N.Y.

[21] Appl. No.: 824,335

[22] Filed: Aug. 15, 1977

[51] Int. Cl.² ............................................ C10J 1/00
[52] U.S. Cl. ........................ 48/77; 48/197 R; 48/DIG. 5; 60/39.12; 60/39.53; 126/113; 261/104; 261/DIG. 9
[58] Field of Search .............. 48/62 R, 76, 77, 73, 48/99, 101, DIG. 5, 202, 206, 210, 197 R; 261/104, 107, DIG. 9; 60/39.05, 39.12, 39.53, 39.59; 126/113

[56] References Cited

U.S. PATENT DOCUMENTS

| | | | |
|---|---|---|---|
| 2,159,434 | 5/1939 | Frey | 48/DIG. 5 |
| 3,520,416 | 7/1970 | Keedwell | 261/104 |
| 3,532,270 | 10/1970 | Schoen | 261/104 |
| 3,731,485 | 5/1973 | Rudolph et al. | 60/39.53 |
| 3,958,956 | 5/1976 | Goeke | 48/76 |

Primary Examiner—Robert L. Lindsay, Jr.
Assistant Examiner—George C. Yeung
Attorney, Agent, or Firm—L. I. MaLossi; J. T. Cohen; M. Snyder

[57] ABSTRACT

A clean, cool stream of low BTU gas is heated and saturated with water vapor by means of a hot liquid stream containing water. Contamination of the gas stream by droplets, particulate matter and salt content of the liquid stream is obviated by maintaining separation between the gas and liquid phases by means of a microporous barrier. The barrier is made of a material selected from the group consisting of hydrophobic polymer material and hydrophilic polymer material having a gel structure.

11 Claims, 6 Drawing Figures

U.S. Patent
July 18, 1978
4,101,294
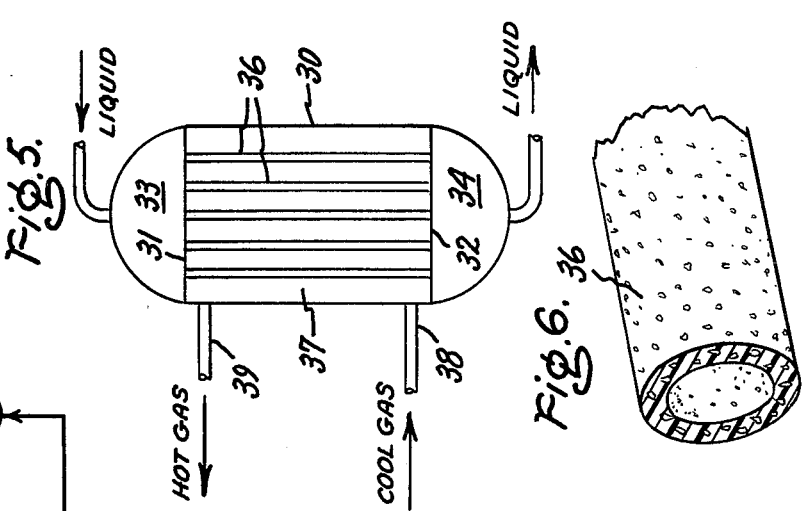
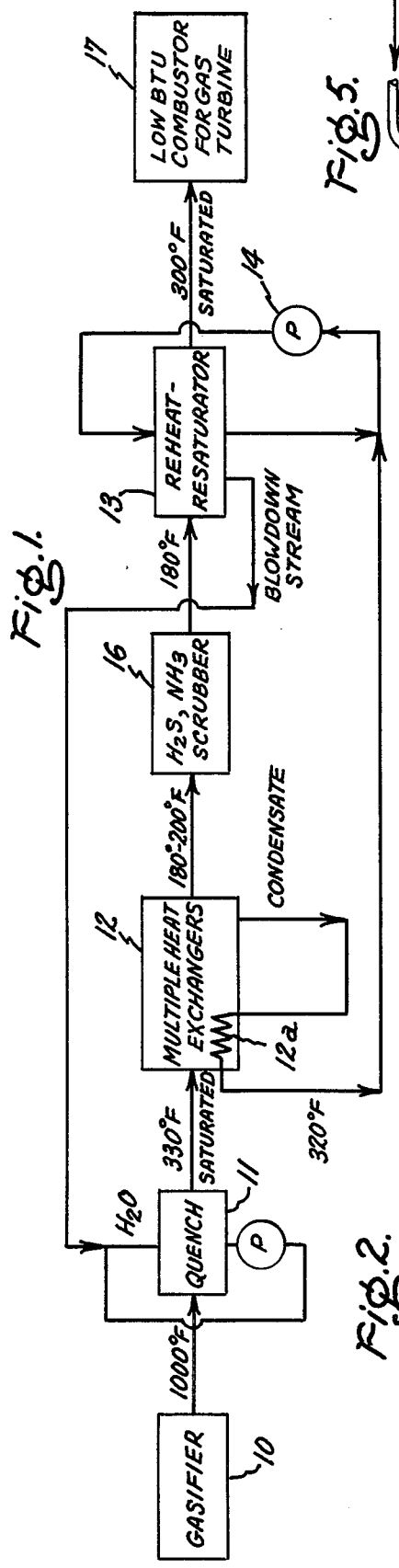
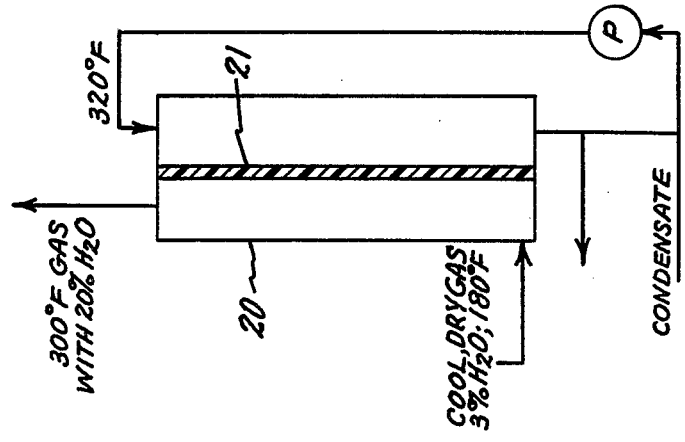

PRODUCTION OF HOT, SATURATED FUEL GAS

BACKGROUND OF THE INVENTION

The instant invention relates to the production of low BTU fuel for use in a combined cycle power plant. In order to maximize the efficiency of the gas turbine component in such an arrangement, it is preferred that the fuel gas supplied to the combustor thereof be hot and be saturated with water vapor. Therefore, it has been proposed to subject a gasifier product gas stream, which has been cooled to accommodate the cleanup sequence, to a reheat and resaturation step prior to entry thereof into the combustor.

The reheat and resaturation step so proposed would be accomplished in a packed tower or tray tower by direct contact between the cool, clean gas and a hot, water-containing liquid stream, generated in preceding process steps.

Unfortunately, the liquid stream contains particulates and dissolved salts. Direct contact between the liquid and gas streams as proposed would result in the entrainment of droplets in the product gas stream in normal operation and, in the event that foaming occurs in the tower, such carryover would be inevitable. The entrainment of droplets in the fuel gas will result in the transfer of such droplets to the combustor and this in turn will cause undesirable flame conditions (e.g., a luminous flame which results in overheating of the combustor lining) and such droplets may contain alkali metal salts, which pose problems of corrosion of the hot gas path including the transition piece and turbine section.

The term "microporous" as used in describing the barrier employed herein refers to conditions of porosity such that the cross-sections of the individual pores have areas equivalent to circles having diameters of less than about 1 micrometer and flow communication through the barrier occurs via more than about 5% of the pores (e.g., through interconnection of the pores).

Percentages used herein to describe water vapor content of a gas stream refer to percent by volume.

DESCRIPTION OF THE INVENTION

A clean, cool stream of low BTU gas is heated and saturated with water vapor by means of a hot liquid stream containing water. Contamination of the gas stream by liquid droplets, particulate matter and salt content from the liquid stream is obviated by maintaining separation between the gas and the liquid phases by means of a microporous barrier. The barrier is made of a material selected from the group consisting of hydrophobic polymer material and hydrophilic polymer material having a gel structure.

The heated liquid stream is brought into contact with one side of the microporous barrier and the cool product gas stream is brought into contact with the opposite side of the same microporous barrier. The high vapor pressure of the liquid promotes rapid transfer of water vapor through the barrier and into the gas stream. Preferably the flow is countercurrent in order to more effectively transfer heat from the hot liquid stream to the gas stream via the hot water vapor being transferred and via heat exchange through the microporous barrier.

BRIEF DESCRIPTION OF THE DRAWING

The subject matter of the instant invention for which protection is sought is presented as claims at the conclusion of the written presentation of the invention set forth herein. This presentation includes the manner and process of making and using the invention and the accompanying drawing forms part of the description for schematically illustrating the invention and the best mode.

The view shown in FIG. 1 schematically sets forth a flow sheet of the process, proposed in the prior art;

FIG. 2 presents a schematic illustration of improved apparatus for carrying out the reheating and resaturation step;

FIG. 3 is a highly simplified sketch to illustrate the principle of the instant invention when a microporous hydrophobic polymer barrier is employed between the liquid and gas streams;

FIG. 4 is similar to FIG. 3 for the purpose of illustrating the mode of water vapor transfer through a hydrophilic polymer barrier material having a gel structure;

FIG. 5 is a schematic representation of the best mode contemplated for the apparatus of this invention; and FIG. 6 is a detailed view of the tubing employed in FIG. 5.

MANNER AND PROCESS OF MAKING AND USING THE INVENTION

In the process outlined in FIG. 1, raw product gas leaves the fixed bed gasifier 10 at temperatures ranging from about 900° to 1200° F and contains dust and vaporized condensible hydrocarbons including tar. In order to drop the temperature of this product gas and provide an initial cleanup, the gas stream enters the direct contact cooler 11 wherein water is sprayed into the gas stream. The product gas so quenched leaves cooler 11 at about 330° F saturated with water.

Next, the temperature of the product gas stream is reduced still further (to about 180°–200° F) by passage through a series of heat exchangers 12. In the process of cooling the product gas stream to this extent, a condensate is produced comprising water, oils, tar and other hydrocarbon liquids. It is desirable to reintroduce the water and oil content of this condensate stream into the product gas. To accomplish this it has been proposed to raise the temperature of the condensate stream and then conduct this hot liquid stream to the reheat/resaturator 13, which is normally a packed tower or a tray tower.

As shown in FIG. 1 the condensate stream leaving heat exchanger units 12 is made to re-enter one (indicated as 12a) of the multiple heat exchangers 12 where it is heated to about 320° F. From heat exchanger 12a the hot condensate stream passes to pump 14 whereby it is introduced at the top of tower 13. Alternatively, the heating of the condensate stream can be carried out in a steam heat exchanger.

After the cooled product gas stream leaves heat exchangers 12, it enters scrubber 16 for the removal of hydrogen sulfide and ammonia therefrom. The clean, cooled (about 180° F) dry (about 3% water vapor) product gas stream would then enter tower 14 wherein by direct contact with the hot liquid gas stream it would be converted to a temperature of about 300° F and be saturated with water vapor and some hydrocarbon vapor. Now the product gas stream would be ready for use as a fuel in a low BTU combustor 17.

The disadvantages of utilizing a direct contact device as the reheat/resaturator 13 have been set forth hereinabove. In accordance with the objective of the instant invention, tower construction 13 is replaced with device 20 (FIG. 2) schematically illustrating the principle of maintaining the gas and liquid streams separate from each other while still achieving the requisite functions of reheating and resaturating the gas and, moreover, obviating the introduction of particulates, liquid droplets, or dissolved salts therein.

As is schematically represented in FIG. 2, the hot condensate stream is maintained separate from the product gas flow by microporous barrier 21 through which heat and water vapor are able to transfer from the condensate stream to the gas stream raising the temperature thereof from about 180° F to about 300° F and increasing the water content from about 3% to a water content in the 20 – 30% range (saturation). Microporous barrier 21 may be made from a material selected from the group consisting of hydrophobic polymer material and hydrophilic polymer material having a gel structure.

FIG. 3 is a schematic representation of the interrelationship occurring between liquid (condensate) A, pore B, and gas C when the microporous polymer barrier 21 is a hydrophobic material. The pores of interest will directly or indirectly (i.e., by interconnection with each other) provide a continuous path from one face to the opposite face of membrane D and, for convenience, these pores are shown as holes B passing directly through membrane D. The small cross-section of each pore B and the hydrophobic nature of the walls thereof prevent liquid A from entering and passing through membrane D via these pores. However, pores B do provide flow communication through membrane D for water vapor to leave liquid A (at a high vapor pressure) and enter gas C. At the same time heat is transferred from liquid A to gas C via the hot vapor and by heat exchange through membrane D.

Suitable microporous membranes made of hydrophobic polymer material are commercially available. One is made of fluorinated hydrocarbon polymer (Gore-Tex, a trademark of W.L. Gore and Associates, Inc.) and another is made of polypropylene (Celgard ® made by the Celanese Corporation of America).

In the case of microporous barrier of hydrophilic polymer membrane material having a gel structure, as is shown in FIG. 4 the aqueous component of the liquid stream will enter and fill pores F, but will not enter the gas stream in the liquid state. Once again, the high vapor pressure of the liquid stream provides ready transport of water vapor into the gas stream. Heat is transferred as described above with respect to the hydrophobic barrier. Thus, in this manner, membrane G of hydrophilic gel-like structure material also functions to provide the necessary transfer of heat and water vapor from the liquid stream to the gas stream. Representative of such hydrophilic materials are sulfonated polyxylylene oxide, cellulose and cellulose acetate.

The preparation of suitable membranes from these latter materials is described in one or more of the following: "Synthetic Polymer Membranes" by R. E. Kesting (McGraw Hill, New York, 1971, pp 116–157); "Reverse Osmosis Performance of Poly (2.6-dimethylphenylene ether) Ion Exchange Membranes" by S. G. Kimura (Ind. Eng. Chem. Prod. Res. Develop., 10 No. 3, 1971), and U.S. Pat. No. 3,259,592 — Fox et al.

The terms "gas" or "gases" as used herein are interchangeable with "vapor" or "vapors".

Microporous hydrophilic materials that are not polymers having a gel-like structure (i.e., which have an open pore structure) are not useful for the manufacture of barriers for the practice of this invention, because such barriers will result in "seepage" of liquid into the gas stream possibly resulting in liquid entrainment, if the seepage is excessive.

BEST MODE CONTEMPLATED

The arrangement shown in FIG. 2 is illustrative of the principle of separation, but the preferred structure will be a shell and tube arrangement as is shown in FIG. 5. Shell 30 is divided into three compartments by headers 31 and 32. As shown, the liquid flow is confined to compartments 33, 34 and the interior of tubes 36, which are schematically illustrated extending between headers 31 and 32 and providing flow communication between chambers 33 and 34. The cool dry gas enters chamber 37 via conduit 38, passes between and around tubes 36, is reheated and becomes resaturated and then leaves chamber 37 via conduit 39 as a clean, hot saturated gas ready for use in a combined cycle power plant.

One of tubes 36 having a microporous hydrophobic wall is shown in FIG. 6. The inner diameter of tubes 36 may range from about 10 mils to about ½ inch, and the tubes would be made of Gore-Tex, or similar fluorinated hydrocarbon polymer porous membrane.

It is preferred to pass the liquid flow through the tubes with the gas passing external to the tubes in order to minimize fouling, because the fouling of the tubes is less apt to occur in this configuration.

What I claim as new and desire to secure by Letters Patent of the United States is;

1. In apparatus for the production of a low BTU fuel gas stream comprising in combination a coal gasifier and, thereafter in sequential flow communication therewith, means for adding water to the product gas stream from said coal gasifier to reduce the temperature thereof; heat exchange means for further reducing the temperature of said product gas stream sufficient to condense water therefrom; means for reducing the hydrogen sulfide and ammonia content of said product stream; and means for reheating said product stream and increasing the water vapor content thereof by means of a hot liquid, the improvement in which the means for reheating the product stream and increasing water vapor content thereof comprises in combination:
   an enclosure;
   means disposed in said enclosure for defining two separate flow volumes therein;
   means connected to said enclosure for admitting a first fluid flow into one of said flow volumes;
   means connected to said enclosure for removing first fluid flow from said one flow volume;
   means connected to said enclosure for admitting a second fluid flow into the other of said flow volumes; and
   means connected to said enclosure for removing second fluid flow from said other flow volume;
   said defining means being formed at least in part as a microporous barrier;
   said microporous barrier being made of a material selected from the group consisting of hydrophobic polymer material and hydrophilic polymer material having a gel structure.

2. The improvement of claim 1 wherein the microporous barrier is provided in the form of tubes.

3. The improvement of claim 2 wherein the wall of each tube is made of a hydrophobic polymer material.

4. The improvement of claim 2 wherein the tubes extend between and through a pair of spaced headers.

5. The improvement of claim 1 wherein the barrier is made of hydrophobic polymer material.

6. The improvement of claim 5 wherein the hydrophobic polymer material is polytetrafluoroethylene.

7. The improvement of claim 1 wherein the barrier is made of a hydrophilic polymer material having a gel structure.

8. The improvement of claim 7 wherein the hydrophilic polymer material is sulfonated polyxylylene oxide.

9. In the method of producing a low BTU fuel gas stream comprising the steps of gasifying coal; adding water to the product gas stream so produced, thereby reducing the temperature thereof; further reducing the temperature of said product gas stream sufficient to condense most of the water vapor contained therein; separating the condensate so produced from said product gas stream; reheating said condensate; removing hydrogen sulfide and ammonia from said product gas stream, and employing said heated condensate to reheat said product gas stream and increase the water vapor content thereof, the improvement comprising:

reheating and increasing the water content of said product gas stream by bringing said heated condensate into contact with one side of a microporous barrier and bringing said product gas stream into contact with the opposite side of said microporous barrier, said microporous barrier being made of material selected from the group consisting of hydrophobic polymer material and hydrophilic polymer material having a gel structure.

10. The improvement of claim 1 wherein the water vapor content of the product gas stream is raised from about 3% to a water vapor content in the range of from about 20-30%.

11. The improvement of claim 9 wherein the heated condensate is passed through a plurality of polymer tubes surrounded by the product gas stream, the wall area of said polymer tubes providing the microporous barrier.

* * * * *